Dec. 16, 1930.  T. H. SLOAN  1,785,535
METHOD OF FORMING THIN WALLED GLASS ARTICLES
Filed Sept. 28, 1929
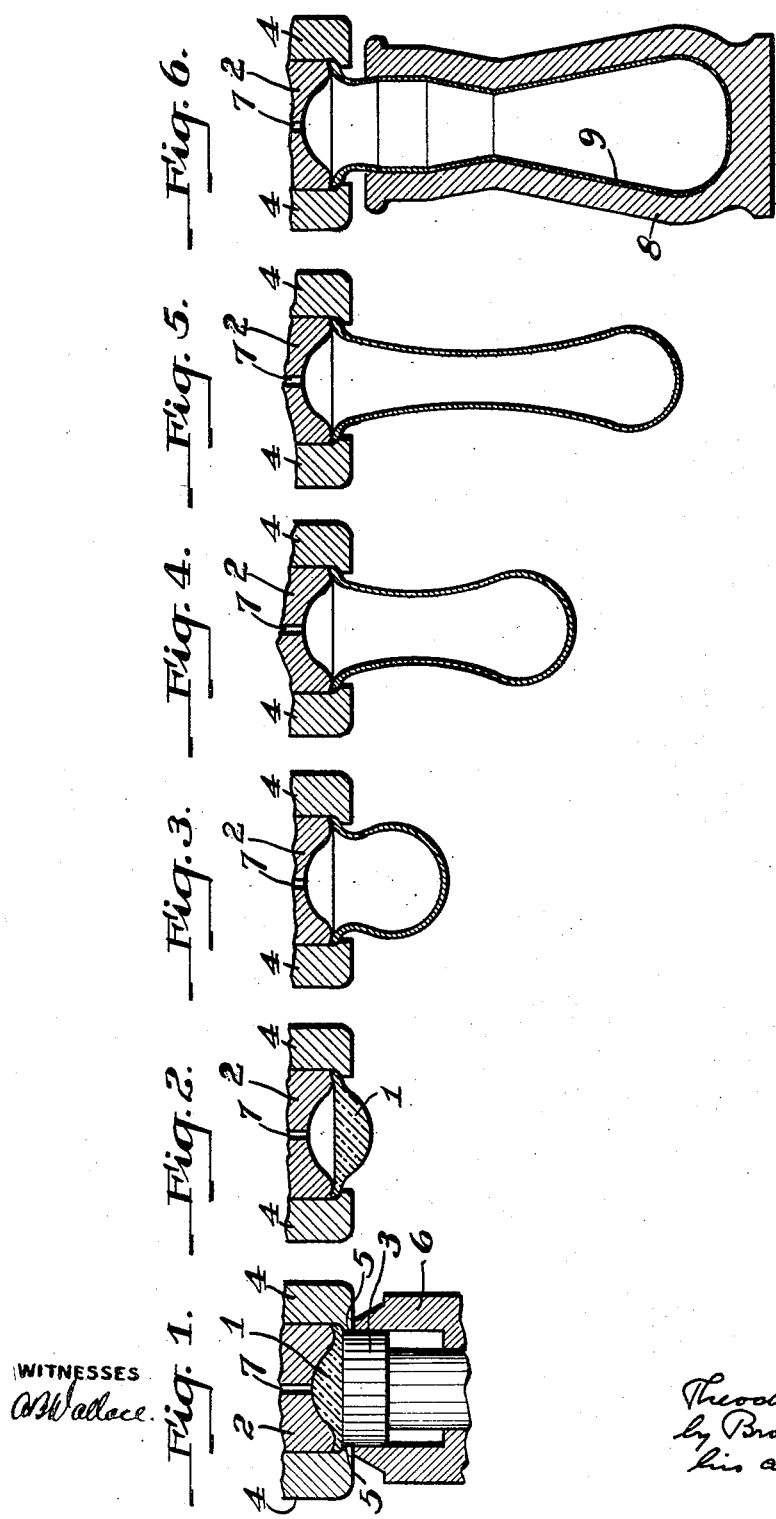
INVENTOR
Theodore H. Sloan,
by Brown & Critchlow,
his attorneys.

Patented Dec. 16, 1930

1,785,535

UNITED STATES PATENT OFFICE

THEODORE H. SLOAN, OF CHARLEROI, PENNSYLVANIA, ASSIGNOR TO MACBETH-EVANS GLASS COMPANY, A CORPORATION OF PENNSYLVANIA

METHOD OF FORMING THIN-WALLED GLASS ARTICLES

Application filed September 28, 1929. Serial No. 395,894.

The invention relates to the manufacture of glass articles, particularly paste mold blown articles such as electric lamp bulbs, lamp chimneys, tumblers, and the like.

In the hand production of paste mold glass articles, the practice is, and from time out of mind has been, for a workman to gather a body of glass on the end of a blow pipe, and thereafter marver the gather to preliminarily shape it and chill its outer surface to form a skin having a suitable heat gradient. The workman then puffs the marvered blank while holding the blow pipe upwardly and rotating it continuously or intermittently as may be required. He then swings the blow pipe with the puffed blank in a downward position to properly elongate and enlarge the blank, after which he places it in a mold for final blowing during which the blank is rotated within the mold or the mold is rotated with relation to the blank.

Within the past several years, commercially successful machines have been produced for the manufacture of this type of glassware. However, it is characteristic of such machines that their mechanism is constructed and operated to simulate the procedure of hand manufacture. Parisons or blanks are formed on the upper ends of vertically disposed blow heads, and in such positions of the blow heads the blanks are puffed. The blow heads are then turned downwardly while puffing continues, and the heads are simultaneously rotated on their longitudinal axes. Thereafter, the heads are usually swung in their downward positions to elongate the blanks which are then enclosed in molds for final blowing, the blanks being rotated in the molds during such blowing.

The object of this invention is to provide a simplified method of forming thin-walled, particularly paste mold, glass articles, whereby they may be made rapidly and at a low cost.

The invention is predicated upon my discovery that by pressing on the lower end of a vertically disposed blow head a blank or parison of a particular shape, the blank may be developed and blown while the blow head is maintained in its vertically disposed position and while the blank is laterally unconfined and is unsupported from below. As to shape, the blank when so pressed is of plano-convex form having a dome-shaped upper and a substantially plane lower surface, the blank being surrounded by a flange which is chilled by the chuck in which the blank is formed, and being materially wider than its maximum thickness.

In developing the blank for blowing, it is first held by its chilled flange while the latter is in a horizontal position and while the central portion of the blank sags downwardly through the flange, the general shape of the blank then being the reverse of that in which it was originally pressed, that is to say, the blank then having a dome-shaped lower surface. While maintaining a blank in the same position, it is then caused to elongate downwardly by slightly blowing or puffing it until it is of the required length and form for final blowing. The thus elongated blank is then placed in a mold and blown to a finished article, there being a relative rotation between the blank and the wall of the mold when blowing paste mold articles. I have discovered that by thus forming and developing a blank for blowing, the glass is so distributed as to form a finished article having uniform wall thickness.

The invention may be further explained by reference to the accompanying drawings in which it is illustrated in its applicability to the forming of incandescent electric lamp globes. In the drawings, Fig. 1 is a vertical central sectional view through the lower end of the blow head and the upper end of a pressing plunger, while the two are cooperating to form a pressed blank; Fig. 2 a similar view of the lower end of the blow head after the blank has sagged downwardly through its chilled flange; Figs. 3, 4 and 5 views similar to Fig. 2 illustrating successive stages of the further development and downward elongation of the blank; and Fig. 6 a vertical central sectional view through the lower end of the blow head and a mold with a blown lamp bulb in the mold.

Referring first to Fig. 1, a blank 1 is pressed between an upper parison mold 2 and a vertically movable plunger 3, the mold forming part of a blow head and being surrounded by movable chuck fingers 4 having inwardly extending lips 5 lying beneath the outer edge of the plunger to form a chilled flange on the blank. In thus forming a blank, a body of molten glass may be placed upon plunger 3 while it is lowered in a surrounding cup 6, and the plunger then moved upwardly. As shown, the lower or forming face of mold 2 is concave to provide the blank with a dome-shaped upper surface, and the upper or forming face of plunger 3 is plane to provide the blank with a flat, or substantially flat lower surface.

After the blank is thus pressed, plunger 3 is lowered, and it and cup 6 are removed from the bottom of the blow-head, and the blank is then permitted to sag downwardly through its chilled flange to substantially the form shown in Fig. 2. Thereafter the blank is elongated both by gravity and by blowing, either a continued stream of low pressure air or by intermittent puffs of higher pressure air admitted to the blank through an opening 7 suitably provided in mold 2. This operation is continued to develop the blank in the manner generally indicated in Figs. 3, 4 and 5, the latter showing the blank fully developed for blowing. During this development of the blank it is preferably continuously held in its downward position indicated in the drawings, and may, if desired, be intermittently or continuously rotated on its vertical axis, this being desirable in some cases. In the final forming operation the elongated blank is placed in a mold 8 and blown, the glass being rotated in the mold when forming paste mold articles such as the lamp globe 9 herein illustrated.

In the practice of this invention I have found that glass articles having thin walls of uniform thickness throughout may be made very rapidly and at a low cost, by the use of a simple machine, the procedure being a radical departure from the hand method of forming such articles, and from the method practiced by machines prior to my invention. I have found it to be essential to the attainment of this result that the pressed blank be of the form described. The chilled skin formed on the lower plane face of the pressed blank appears to effect, during the development of the blank, a uniform distribution of the molten glass in the dome-shaped portion of the blank, in a way which I have found cannot be done by pressing a blank with its thickened central portion originally lying below its chilled flange.

According to the provisions of the patent statutes, I have described the principle and mode of operation of my invention, and have illustrated the preferred manner of practicing it. However, I desire to have it understood that, within the scope of the appended claims, the invention may be practiced otherwise than as specifically illustrated and described.

I claim as my invention:

1. The method of forming a thin-walled glass article, comprising pressing molten glass to form a blank having a dome-shaped upper surface surrounded by a chilled flange, holding the blank horizontally by its chilled flange while its central portion sags and elongates downwardly therethrough, and blowing a finished article from the elongated blank.

2. The method of forming a thin-walled glass article, comprising pressing molten glass to form a blank having a dome-shaped upper and a substantially plane lower surface surrounded by a chilled flange, the blank having a horizontal diameter materially greater than its maximum thickness, holding the blank horizontally by its chilled flange while its central portion sags and elongates downwardly therethrough, and blowing a finished article from the elongated blank.

3. The method of forming a thin-walled glass article, comprising pressing molten glass to form a plano-convex blank surrounded by a chilled flange, holding the blank horizontally by its chilled flange with its convex surface upwardly while the blank sags and elongates downwardly through its chilled flange, and blowing a finished article from the elongated blank.

4. The method of forming a thin-walled glass article, comprising pressing molten glass to form a blank having a dome-shaped upper and a substantially plane lower surface surrounded by a chilled flange, holding the blank horizontally by its chilled flange while its central portion sags downwardly therethrough, blowing the sagged blank to elongate it downwardly, and blowing a finished article from the elongated blank.

5. The method of forming a thin-walled paste mold glass article, comprising pressing molten glass to form a blank having a dome-shaped upper and a substantially plane lower surface surrounded by a chilled flange, the blank having a horizontal diameter materially greater than its maximum thickness, holding the blank horizontally by its chilled flange while its central portion sags downwardly through the flange, blowing the blank to elongate it downwardly, and blowing a finished article from the elongated blank while simultaneously rotating it on its longitudinal axis.

In testimony whereof, I sign my name.

THEODORE H. SLOAN.